United States Patent
Kern-Emmerich et al.

(10) Patent No.: US 8,141,913 B2
(45) Date of Patent: Mar. 27, 2012

(54) PRESS FITTING FOR A PIPE

(75) Inventors: Thomas Kern-Emmerich, Niederwerrn (DE); Klaus Rippstein, Ebelsbach (DE)

(73) Assignee: Uponor Innovation AB, Fristad (SE)

( * ) Notice: Subject to any disclaimer, the term of this patent is extended or adjusted under 35 U.S.C. 154(b) by 652 days.

(21) Appl. No.: 11/993,339

(22) PCT Filed: Jun. 6, 2006

(86) PCT No.: PCT/EP2006/062930
§ 371 (c)(1),
(2), (4) Date: Apr. 7, 2009

(87) PCT Pub. No.: WO2007/031348
PCT Pub. Date: Mar. 22, 2007

(65) Prior Publication Data
US 2009/0218814 A1    Sep. 3, 2009

(30) Foreign Application Priority Data
Jun. 21, 2005    (DE) .......................... 10 2005 028 558

(51) Int. Cl.
*F16L 33/20*    (2006.01)

(52) U.S. Cl. ....................................... 285/256; 285/242

(58) Field of Classification Search .................. 285/242, 285/256, 259; 29/508
See application file for complete search history.

(56) References Cited

U.S. PATENT DOCUMENTS

| | | | | |
|---|---|---|---|---|
| 2,679,409 A * | 5/1954 | Spender et al. | ............... | 285/257 |
| 4,270,777 A * | 6/1981 | Fisher | ........................... | 285/242 |
| 4,564,223 A * | 1/1986 | Burrington | ................... | 285/256 |
| 5,772,262 A * | 6/1998 | Dupont et al. | ................ | 285/257 |
| 5,829,795 A * | 11/1998 | Riesselmann | ................ | 285/256 |
| 6,450,549 B1 * | 9/2002 | Schutz | ........................... | 285/256 |
| 6,874,823 B2 * | 4/2005 | Viegener | ....................... | 285/256 |
| 7,293,804 B2 * | 11/2007 | Li et al. | ......................... | 285/256 |
| 2002/0007547 A1 * | 1/2002 | Unewisse et al. | ............... | 29/516 |

FOREIGN PATENT DOCUMENTS

DE    42 31 623 A1    3/1994
(Continued)

OTHER PUBLICATIONS

International Search Report dated Sep. 20, 2006, for corresponding Application No. PCT/EP2006/062930, 3 pgs.

*Primary Examiner* — James Hewitt
(74) *Attorney, Agent, or Firm* — Occhiuti Rohlicek & Tsao LLP

(57) ABSTRACT

The press fitting for a pipe is provided with a fitting element which comprises a supporting element onto which a pipe to be connected can be pushed. Furthermore, the press fitting comprises a compression sleeve which has on its circumferential surface a compression region corresponding to the region a pressing tool acts on the compression sleeve during the compression thereof. A plastic ring is situated on the outside of the compression sleeve and is secured thereon against movements in the axial direction of the compression sleeve wherein the plastic ring has at least one axial projection which extends right into the compression region of the compression sleeve and which can be destroyed when the pressing tool acts on the compression sleeve and/or is secured so that it can be separated from the plastic ring.

19 Claims, 4 Drawing Sheets

FOREIGN PATENT DOCUMENTS

| | | |
|---|---|---|
| DE | 43 04 680 C1 | 4/1994 |
| DE | 29503019 | 5/1995 |
| DE | 195 45 361 A1 | 6/1997 |
| DE | 196 03 228 A1 | 7/1997 |
| DE | 297 11 313 U1 | 10/1997 |
| DE | 197 41 641 A1 | 3/1999 |
| DE | 299 07 585 U1 | 9/1999 |
| DE | 198 45 720 A1 | 4/2000 |
| DE | 200 13 425 U1 | 1/2001 |
| DE | 100 10 573 C1 | 3/2001 |
| DE | 199 45 113 A1 | 3/2001 |
| DE | 100 21 988 A1 | 11/2001 |
| DE | 102 33 559 B3 | 1/2004 |
| DE | 20 2004 011 441 U1 | 12/2004 |
| EP | 0 611 911 A1 | 8/1994 |
| EP | 0 728 979 A1 | 8/1996 |
| EP | 0 942 219 A2 | 9/1999 |
| EP | 1 477 719 A1 | 11/2004 |

\* cited by examiner

PRESS FITTING FOR A PIPE

BACKGROUND

The invention is directed to a press fitting for a pipe, in particular for a plastic pipe or a pipe of a plastic/metal composite material.

Press fittings for the connection of pipes are known in a number of designs. They mostly comprise a compression sleeve that radially deformed by means of a pressing tool, whereby the connection end of the pipe surrounded by the compression sleeve is pressed against a supporting body of the fitting and is sealed thereby.

To facilitate the mounting of a press fitting of the type mentioned above, manufacturers are known to permanently connect the compression sleeve with the fitting body. Thereby, a an annular space open to one side is formed between the compression sleeve and the supporting body of the fitting body, into which space the pie end to be connected is pushed. Examples for press fittings comprising a compression sleeve connected with the fitting body are described in DE-A-42 31 623 and DE-C-100 10 573.

Besides a direct connection of the press fitting and the fitting body, it is also known in prior art to connect these two elements of a press fitting through an annular connection member. Examples of such press fittings are found in DE-C-43 04 680, EP-A-0 611 911, DE-U-295 03 019, DE-A-198 45 720 and EP-A-0 942 219. Some of the annular connection elements known from these publications have the additional purpose of providing for a galvanic separation of the front end of the pipe and the fitting body, as well as for a guiding of the pressing tool. The latter purpose is also fulfilled by the plastic rings described in DE-A-100 21 988 and DE-U-299 07 585, which surround the compression sleeves of these known press fittings on the outside.

Finally, it also known to provide the compression sleeves of press fittings with position control openings. These openings allow the fitter to check right before pressing, whether the pipe end to be connected is correctly slipped onto the supporting body of the press fitting. Examples of press fittings with position control openings are described in the two above-mentioned publications, i.e. DE-C-100 10 573 and DE-U-295 03 019, as well as in DE-C-198 45 720, DE-A-197 41 641, DE-A-196 03 228, DE-A-195 45 361 and DE-U-297 11 313.

From DE-B-102 33 559, a press fitting comprising a compression sleeve held at a supporting body, which is slit at the holding end held at the supporting body, the holding end being surrounded by an axially fixed plastic ring.

Further, it is desirable for the press fitting to visually indicate that a pressing be means of the pressing tool has been performed (pressing indication). Such a press fitting is described in DE-U-299 07 585 and comprises a plastic ring serving as a guiding ring for the pressing tool and being made of a material destructible under the effect of the pressing tool.

SUMMARY

It is an object of the invention to provide a press fitting having a multi-functional plastic ring combining in a simple manner the functions of a press indicator, a means for securing the compression sleeve to the fitting body, and an abutment for the pressing tool.

To achieve this object, the invention proposes a press fitting for a pipe in particular a plastic pipe or a pipe of a plastic/metal composite material, the press fitting being provided with

- a fitting body, comprising a supporting body onto which a pipe to be connected may be slipped,
- a compression sleeve having a holding end at which the compression sleeve is held on the fitting body, and further comprising a compression region on the circumferential surface, which adjoins the holding end and in which a pressing tool acts when the compression sleeve is compressed,
- the compression sleeve having its holding end provided with at least one edge cutout open to the end face of the compression sleeve, which cutout has a bounding edge section opposite the end face of the compression sleeve, and
- a plastic ring which is fitted on the outside of the compression sleeve against the holding end, enclosing the same, and which is secured to the compression sleeve against movement in the axial direction of the compression sleeve.

According to the invention, the press fitting is characterized in
- that the plastic ring comprises at least one axially protruding projection extending into the compression region of the compression sleeve and which may be destroyed when the pressing tool acts on the compression sleeve and/or may be separated from the plastic ring.

The press fitting of the present invention has a fitting body of metal, plastics, a plastics/metal composite material or a ceramic material, which comprises a projecting supporting body (also referred to as a supporting sleeve). The exterior of the supporting body is profiled and may comprise seatings for one or a plurality of sealing elements. The pipe to be connected may be slipped on the exterior of the supporting body.

The press fitting of the present invention further comprises a compression sleeve of a plastically deformable material (generally metal) having one end face formed as a holding end at which the compression sleeve is held directly on the fitting body. When connected with the fitting body, the compression sleeve concentrically encloses the supporting body.

With the fitting of the present invention, the holding end of the compression sleeve is provided with at least one and in particular a plurality, preferably three edge cutouts open to the end face of the compression sleeve. These cutouts are preferably formed as slots or elongate holes. Advantageously, the cutouts are regularly distributed in the circumferential direction of the compression sleeve.

The above described cutouts provide the compression sleeve with some elasticity at its holding end, which facilitates mounting the compression sleeve to the fitting body. The compression sleeve is meant to be mounted to the fitting body so as to be secured against inadvertent separation therefrom. Regardless of whether this (non-positive) connection is realized by a friction fit or by a force fit, for example, the compression sleeve requires some expansion at its holding end. According to the invention, this radial expansion is facilitated by providing slits in the holding end of the compression sleeve or by providing the compression sleeve with other forms of cutouts. For reasons of stability, it is advantageous to connect the compression sleeve directly with the fitting body. Here, it is advantageous to realize this connection as a force-fit connection which requires no special pressing tool or a radial compression of the compression sleeve and the fitting body.

Depending on the material used for the compression sleeve, the restoring ability of the compression sleeve at its holding end may be insufficient, after it has been expanded, to maintain the force-fit connection between the compression sleeve and the fitting body. This is true, for example, when comparatively soft metal materials such as, e.g., aluminum are used.

According to the invention, the elasticity and the restoring ability of the compression sleeve at its holding end is achieved by fitting a plastic ring on the outside of the compression sleeve that surrounds the compression sleeve at the level of the cutouts and sitting on the compression sleeve in a perfectly fitting manner. The plastic ring preferably does not contact the fitting body, in particular not for the purpose of securing the compression sleeve; rather, it is the compression sleeve which contacts the fitting body for the purpose of being secured thereto, preferably directly, i.e. without any intermediate material, which, however, is not excluded.

When slipping the compression sleeve on the fitting body for the connection of both elements, the holding end of the compression sleeve expands elastically. In the process, the plastic ring also deforms elastically, thus pressing radially against the compression sleeve from the outside after expansion. This provides a reliable fit of the compression sleeve on the fitting body even if, due to the selected material of the compression sleeve, the holding end is at least partly plastically deformed when expanded.

For the plastic ring not to change its position at the level of the cutouts in the holding end of the compression sleeve, which position is necessary for the above function, the invention provides that it is secured to the compression sleeve against movement in the axial direction thereof. This may be achieved by a frictional fit or a form fit or by another force-fit connection (e.g. glueing). A form-fit connection is advantageous, wherein the compression sleeve has its holding end provided with an outer annular bead or a similar outer projection, plunging or snapping or locking into a corresponding circumferential recess on the inner side of the plastic ring.

As an alternative, the force-fit connection may also be effected by locking cams on the plastic ring that plunge into the edge cutouts of the compression sleeve and are secured therein against slipping out axially, which may be achieved by form fit or friction fit. Thus, for example, the width (circumferential extension of the compression sleeve) of the edge cutouts may taper towards the end face of the compression sleeve. The locking cams may be moved with force past the narrow parts of the edge cutouts and into the same. Thereafter, due to the narrow parts of the edge cutouts, the locking cams are prevented from slipping out of the edge cutouts whereby the plastic ring is secured to the holding end of the compression sleeve.

According to the invention, the above described plastic ring is provided with at least one axially protruding projection that extends from the plastic ring up into the compression region of the compression sleeve. This projection is destroyed or separated from the plastic ring (e.g. by shearing) when the pressing tool acts on the compression sleeve for compression. Thus, the plastic sleeve which, as described above, serves to secure the retention of the compression sleeve to the supporting body, is used for a further function by acting as the support for the at least one projection that may be destroyed or separated upon compression. Suitably, the plastic ring further assumes the function of an abutment for the press tool or of a guide for the press tool during the operation of compressing.

All functions of the plastic ring may also be assumed by a (securing) ring of another material than plastics, provided the material is sufficiently elastic and strong for the purposes envisaged by the invention.

In an advantageous development of the invention it is provided that the at least one projection extends for less than 180° in the circumferential direction of the plastic ring. Suitably, three projections are provided that are regularly shifted and spaced from each other.

A plastic ring with at least one projection preferably is an element made of two different plastic materials, wherein the material of the at least one projection should be more brittle than the material of the plastic ring. As an alternative, it is also possible to form the plastic ring and the projection from the same material, the connection between the plastic ring and the projection being formed as a rated breaking point along which the projection is broken from the plastic ring when the pressing tool acts thereon.

Preferably, the plastic ring has no radially inward projecting portions; suitably, in particular no (inner) projections or the like exist that plunge into the edge cutouts. The locking against axial displacement and/or rotation can advantageously be realized by a form fit, a friction fit or a material connection only between the outside of the compression sleeve and the inside of the plastic ring, the compression sleeve having an outer knurling or another surface structure (e.g. flashes formed in particular by slightly upright material of the compression sleeve, which may be formed when punching or forming the edge cutouts of the compression sleeves) that causes a clawing thereof into the material of the plastic ring that is softer than that of the compression sleeve. An adhesive connection or a press fit between the compression sleeve and the plastic ring is conceivable.

In particular, a form fit connection is also suitable as a connection between the fitting body and the compression sleeve. Feasibly, a locking connection is conceived in this case as well, the holding end of the compression sleeve being provided with a circumferential or a sectional inner projection which locks into a circumferential recess of the fitting body. It is advantageous for the mounting if the holding end of the compression sleeve conically tapers toward the inner projection, i.e. has an inner circumferential bevel that slides over an outer bead of the fitting body when slipping the compression sleeve onto the fitting body, until the inner projection of the compression sleeve plunges into the circumferential recess of the fitting body provided behind the outer bead or until it is positioned at the level thereof. The circumferential recess and the circumferential projection may also be provided in a configuration opposite to the one indicated above.

Realizing a form fit connection without a friction fit between the compression sleeve and the fitting body is advantageous in that the compression sleeve is situated at the fitting body in a manner secured in the axial direction, but still rotatable relative thereto, which may be advantageous in handling and mounting the press fitting.

In order to see from outside, prior to compression, whether the pipe to be connected has been correctly slipped on the supporting body, the compression sleeve of the present press fitting is suitable provided with position control openings at its holding end. These position control openings may be formed in the compression sleeve in addition to the edge cutouts formed therein, wherein the position control openings do not necessarily be open to the end face of the compression sleeve. As an alternative or in addition, it is also possible that the edge cutouts of the compression sleeve themselves serve as the position control openings. In this case, it has to be made sure by the choice of the axial length and the width of the cutouts in the circumferential direction as well as the position of the plastic ring that the position of the pipe to be connected is visible from outside through the edge cutouts on one or both sides past the plastic ring.

The size of the material cutout portions of the compression sleeve not covered by the plastic ring could be restricted by the axial thickness of the plastic ring which should have a certain minimum thickness, depending on the material, in order to perform the above described restoring function according to the invention. A corresponding thicker plastic ring calls for corresponding axially prolonged material cutouts in the compression sleeve for these material cutouts to still function as position control openings. Axially prolonged material cutouts in the compression sleeve, however, could weaken the same, which is undesirable since the compression sleeve needs a certain stability to be able to keep the pipe to be connected pressed on the supporting body with sufficient force after compression. Therefore, it is suitable to reduce the thickness of the plastic ring in those regions that are radially aligned with the cutouts in the compression sleeve. Thus, in this embodiment of the invention, the plastic ring comprises cutouts on one or both sides. In this manner, it is possible to provide relatively short cutouts in the compression sleeve despite the use of a relatively thick plastic ring, without having to waive the advantage of also using these cutouts for position control purposes.

For the cutouts of a plastic ring of the type described above to always be aligned with the cutouts of the compression sleeve when handling and mounting the press fitting, it is advantageous to arrange the plastic ring on the compression sleeve in a manner secured against rotation. Preferably, this is achieved by the plastic ring having an inward protruding securing projection plunging into one of the cutouts at the holding end of the compression sleeve. Here, the securing projection need not or not substantially protrude inward beyond the compression sleeve. The plastic ring may have a plurality of such securing projections plunging into different cutouts of the compression sleeve. These securing projections may additionally assume the function of the above-mentioned locking projections to axially secure the plastic ring to the compression sleeve.

The plastic ring provided according to the invention primarily serves the purpose to provide elasticity and restoring ability to the holding end of the compression sleeve even if this is not necessarily given by the material of the compression sleeve. Moreover, the plastic ring may also serve for guiding and positioning the pressing tool. Further, its at least one projection serves as a compression indicator, as described above. Finally, it is possible for the plastic ring of the invention to also serve the galvanic separation of the fitting body and the pipe. This is especially required with pipes made of metal or having a metal layer in their wall, as is the case with pipes made of a plastic/metal composite material. Here, the plastic ring serves the purpose of holding the end face of the pipe at a distance from a radial or substantially radial surface of the fitting body, which is situated opposite the pie end face when the pipe has been slipped onto the supporting body. In the plastic ring of the present invention, this galvanic separation may realized, for example, by the anti-rotation securing projection or projections protruding farther inward beyond the inner side of the compression sleeve and possibly being interconnected through an interior collar. In this design, as it were, the plastic ring comprises a ring part resting on the outside of the compression sleeve and a ring part abutting against the inner side of the compression sleeve, which are interconnected via radial webs (previously referred to a securing projections) which in turn extend through the edge cutouts of the compression sleeve when mounted to the compression sleeve.

Finally, it is also possible to indicate what kind of material floes through a conduit provided with such a press fitting by a different coloring of the plastic ring. Thus, for example, a yellow plastic ring could be used for gas lines, a red plastic ring could be used for hot water lines, and, finally, a blue plastic ring could be used for cold water lines. Of course, any other coloring is also conceivable.

BRIEF DESCRIPTION OF THE DRAWINGS

The following is a detailed description of an embodiment of the invention with reference to the drawings. In the figures.

DETAILED DESCRIPTION

Figure 1:
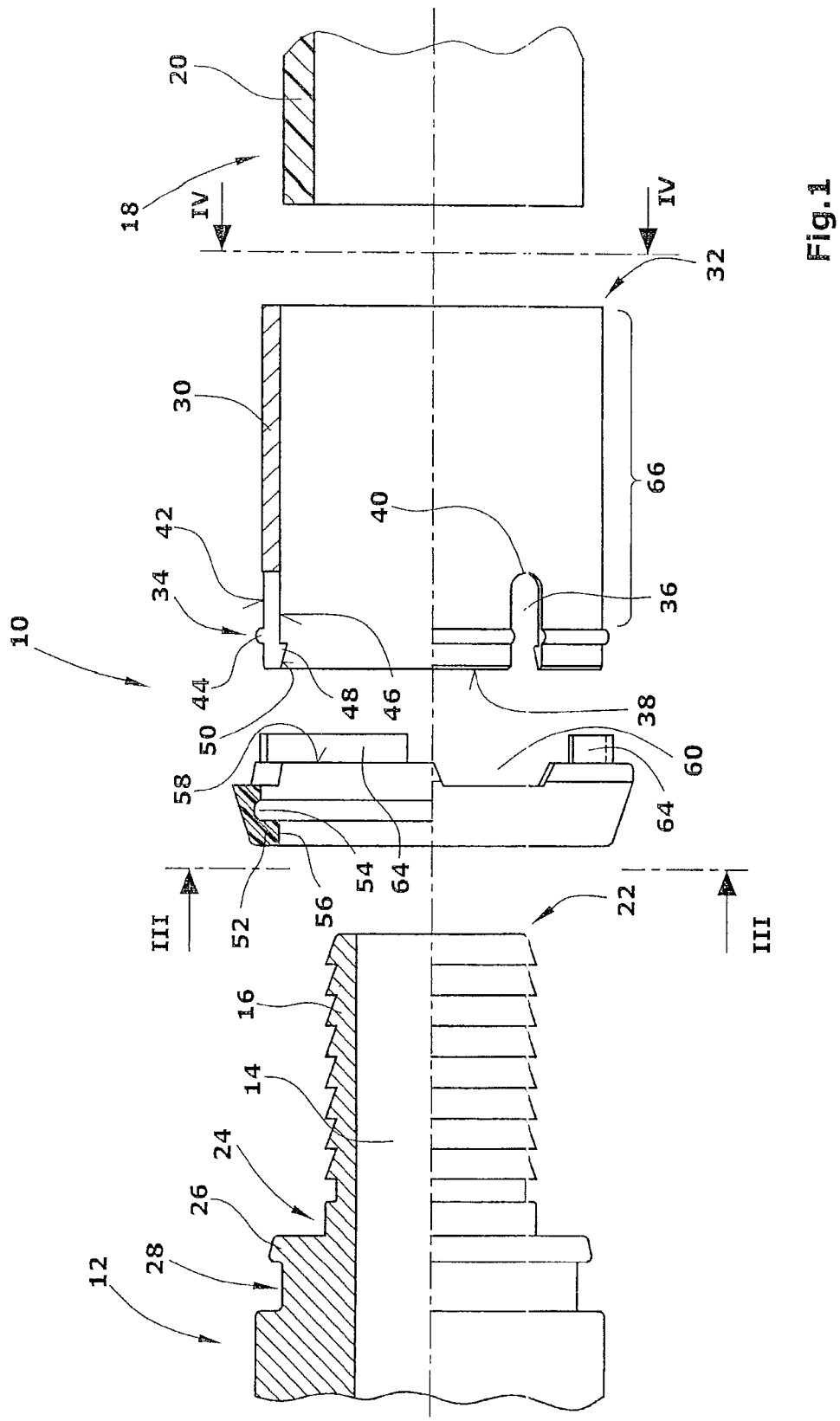
FIG. 1 is a half-section and an exploded view of the individual parts of the present press fitting, a pipe connection end being indicated.
Figure 2:
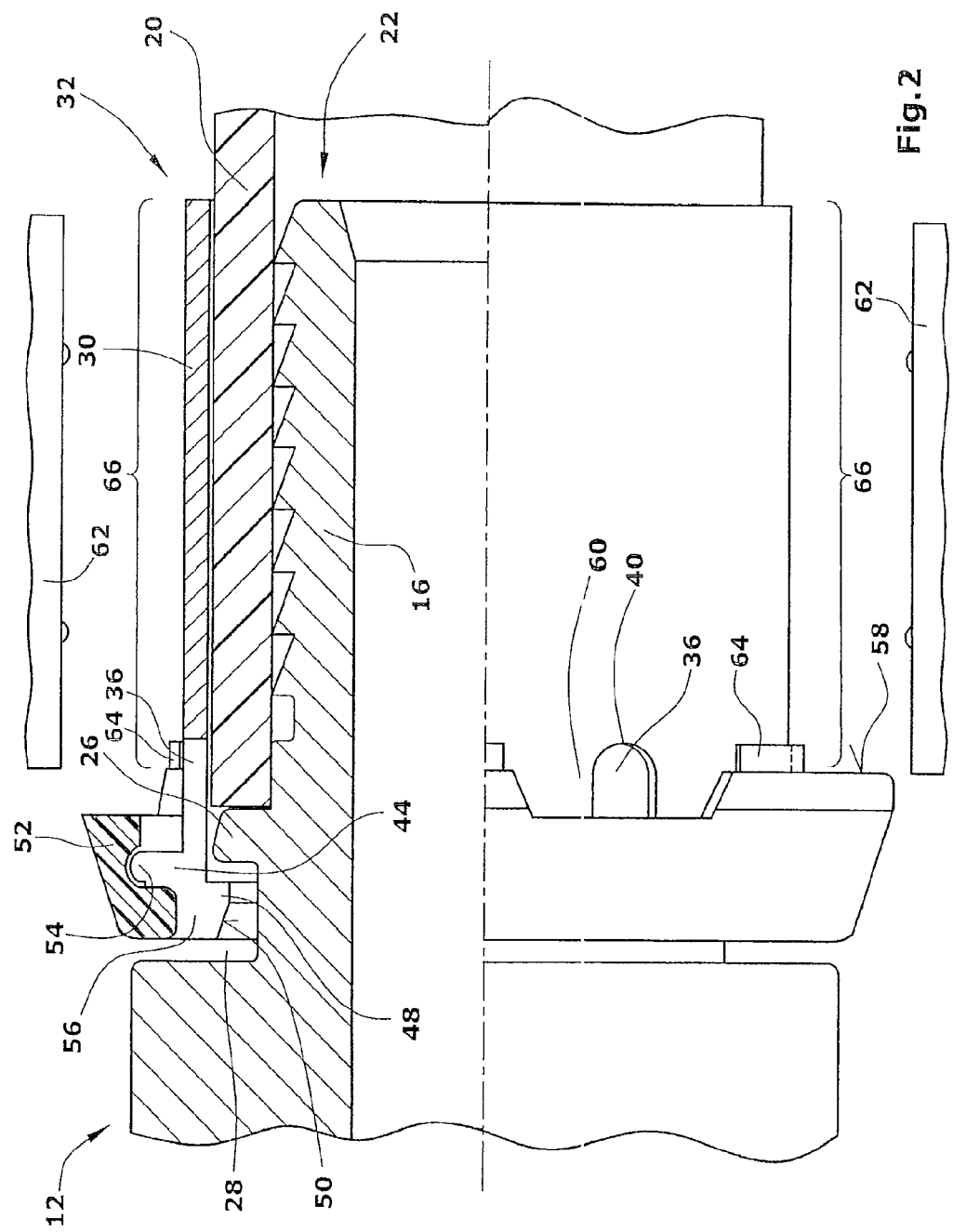
FIG. 2 is a half-section of the press fitting of the invention is the assembled state.
Figure 3:
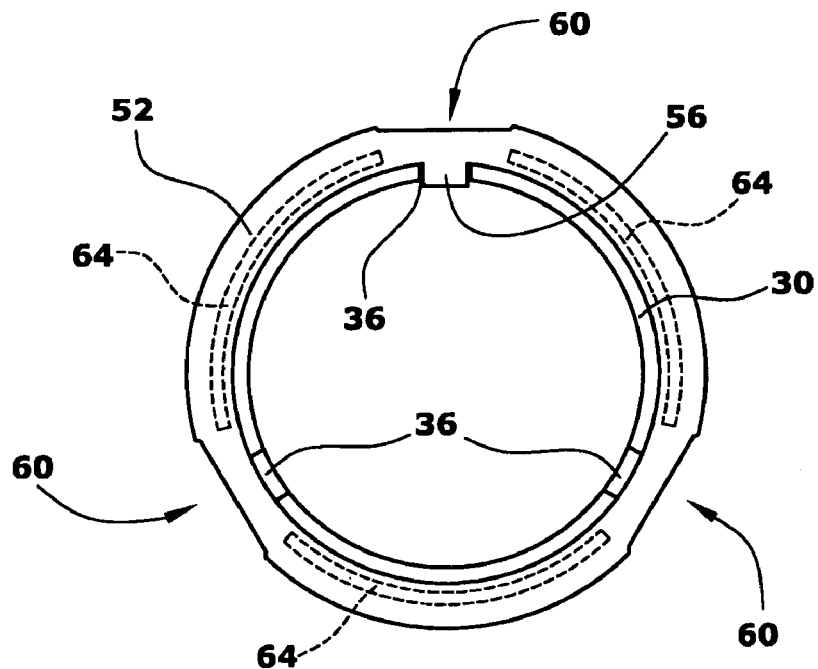
FIG. 3 is a view of the plastic ring along line III-III in FIG. 1.
Figure 4:
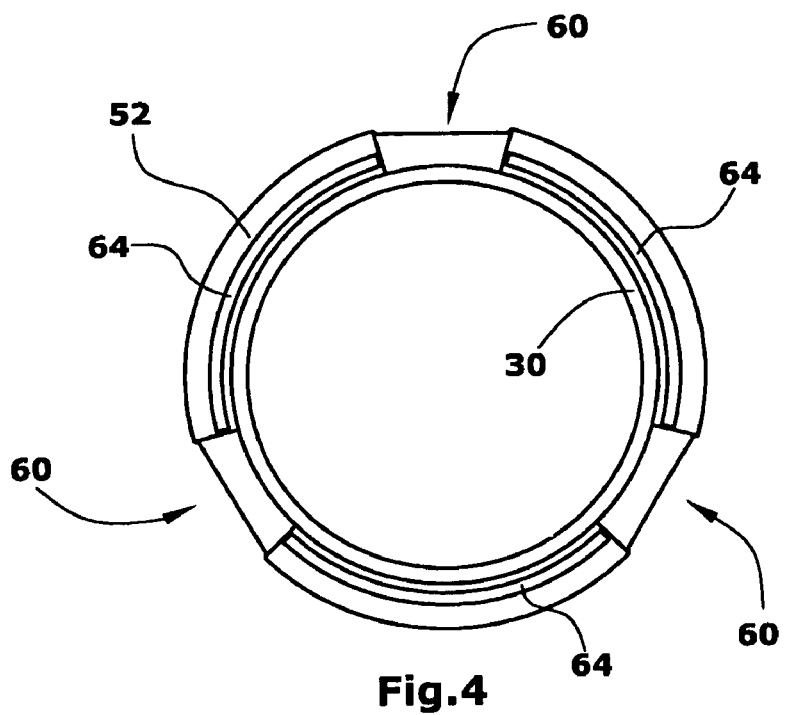
FIG. 4 is a view of the plastic ring along line IV-IV in FIG. 1.
Figure 5:
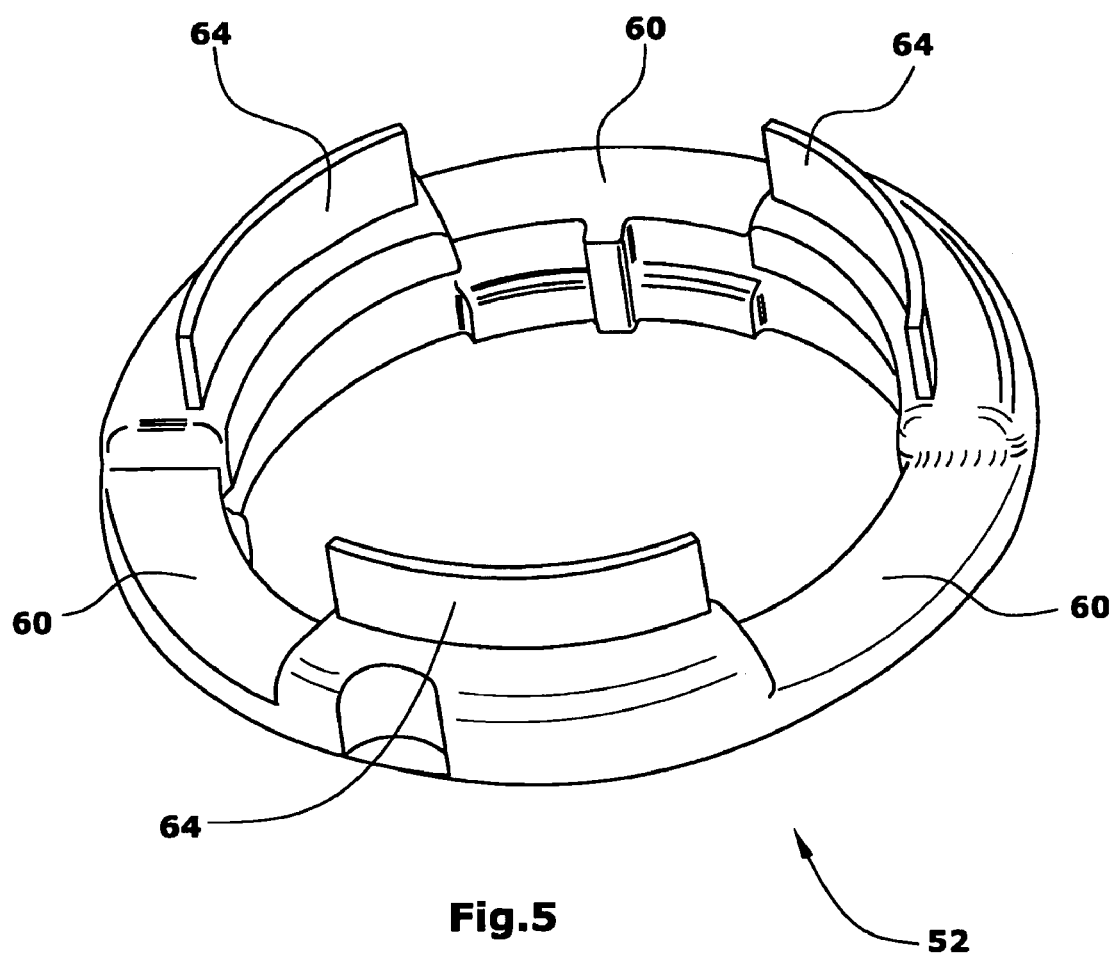
FIG. 5 is a perspective view of a plastic ring applicable to the press fitting of FIGS. 1 to 4, showing the three projections that may be destroyed when the press fitting is compressed.

With reference to FIGS. 1 to 3, the press fitting 10 has a fitting body 12 through which a passage 14 extends. The fitting body 12 is provided with a protruding supporting body 16 onto which the end 18 of a pipe 20 to be connected is slipped. The supporting body 16 has a free end face 22 and an end 24 opposite thereto, where the fitting body 12 has a circumferentially extending outer bead 26 and an also circumferentially extending outer circumferential recess 28 disposed behind the same. This circumferential recess 28 rests on the side of the outer bead 26 averted from the supporting body 16.

A compression sleeve 30 is held to the fitting body 12, which in the present embodiment is made of aluminum or an aluminum alloy. This compression sleeve 30 has an end face 32 substantially aligned with the free end 22 of the supporting body 16, as well as a holding end 34 opposite the same, at which the compression sleeve 30 is connected to the fitting body 12. The holding end 34 is provided with edge cutouts 36, numbering three in this embodiment, open to the end face 38 of the compression sleeve 30. The edge cutouts 36, whose number is principally optional, are formed as elongate holes or slots and are bounded by bounding edge sections 40. On the exterior 42 of the compression sleeve 30, the holding end 34 is provided with a circumferential outer bead 44 interrupted by the cutouts 36, whereas the compression sleeve 30 has its inner side 46 provided with an inner projection 48 that is also circumferential and interrupted by the cutouts 36. The inner projection 48 is hook-shaped and is provided with a conical bevel 50.

On the exterior of the compression sleeve 30, the holding end 34 thereof is provided with a plastic ring 52 having an inner groove 54 into which the outer bead 44 of the compression sleeve 30 plunges. Thus, the plastic ring 52 is secured to the compression sleeve 30 against axial movement. Further, the plastic ring 52 has a radially inward directed securing projection 56 which, in the mounted state of the plastic ring 52, plunges into one of the edge cutouts 36 of the compression sleeve 30.

As is obvious from FIG. 2 in particular, the plastic ring 52 has its side 58 facing the ends 22 and 32 of the supporting body 16 and the compression sleeve 30 provided with cutouts 60 aligned with the edge cutouts 36 of the compression sleeve 30. Through these cutouts 60, comparatively large portions of the edge cutouts 36 of the compression sleeve 30 are exposed so that these portions of the edge cutouts 36 assume the function of position control openings for checking the correct position of the pipe 20 to be connected.

The fitting body 12, the compression sleeve 30 and the plastic ring 52 are mounted as follows.

First, the plastic ring 52 is slipped on the holding end 34 of the compression sleeve 30. Here, the plastic ring 52 may be slightly biased to facilitate mounting and fitting on the compression sleeve. When slipping on the plastic ring 52, it must be oriented such that its securing projection 56 plunges into one of the edge cutouts 36 of the compression sleeve 30. When the plastic ring 52 is slipped on, the outer bead 44 of the compression sleeve 30 is situated in the inner groove 54 of the plastic ring 52.

Thereafter, the compression sleeve 30 together with the plastic ring 52 is slipped over the supporting body 16 until the bevel 50 of the inner projection 48 of the compression sleeve 30 abuts against the outer bead 26 of the fritting body 12. To fix the compression sleeve 30 to the fitting body 12, it is pushed further on the fitting body 12, the cutouts facilitating the expansion of the holding end 34 of the compression sleeve 30. Thereafter, the holding end 34 of the compression sleeve 30 elastically restores itself so that the inner projection 48 plunges into the outer circumferential recess 28 of the fitting body 12. The restoring effect is significantly improved and supported by the plastic ring 52 slipped on before, which is particularly true when comparatively soft metal materials are used for the compression sleeve (aluminum, for example). The temporarily occurring radial forces are compensated by the recesses 36 and the plastic ring 52 so that the outer diameter of the holding end 34 is not enlarged after the compression sleeve 30 has been mounted. In the mounted state, the compression sleeve 30 sits on the fitting body 12 in a manner secured against separation in the axial direction, but it is still rather easily rotated.

The advantages of the press fitting of the present invention can be summarized as follows:
  No deformation of the compression sleeve 30 after mounting on the fitting body 12.
  The compression sleeve 30 may still be rotated after it has been connected with the fitting body 12.
  The edge cutouts 36 of the compression sleeve 30 are well visible despite the plastic ring 52 being mounted, so that they may be used as position control openings.
  The plastic ring 52 may also be used as an abutment surface or another guide for the pressing tool 62 indicated in FIG. 2 (see the abutment and guiding surface at the side 58 of the plastic ring 52 in FIG. 2).
  The plastic ring 52 may also serve the galvanic separation of the pipe 20 from the fitting body 12; to this end, one or a plurality of inner projections of the plastic ring 52 are required that project inward through the edge cutouts 36 and are situated in front of the outer bead 26 of the fitting body 12, seen from the free end 22 of the supporting body 16, whereby they prevent direct contact between the end face of the connecting end 18 of the pipe 20 and the fitting body 12.

With reference to FIGS. 1 to 5, another particularity of the press fitting 10 described will be discussed in the following.

As can be seen in particular in FIGS. 1 and 2, the plastic ring 52 has its (end) face 58 provided with three circumferentially offset and spaced projections 64 that extend beyond the circumferential surface 63 of the compression sleeve 30 in the compression region 66 adjoining the plastic ring 52. The three projections are situated within those regions of the plastic ring 52 that are located between respective adjacent cutouts 60. FIGS. 4 and 5 again clearly illustrate this relative arrangement. As is particularly evident from the illustration in FIG. 2, the projections 64 are thus located in a region in which the pressing tool 62 acts when the compression sleeve 30 is compressed, i.e. when radial pressure on the compression sleeve 30 acts on the projections 64. Thereby, the projections 64 are sheared from the plastic ring 52 or are destroyed or separated from the plastic ring 52 in another manner. Rated breaking points may be provided along the connection of the projections 64 with the plastic ring 52. As an alternative or in addition, the projections 64 are made from a material substantially more brittle than the material of the plastic ring 52. In particular, the plastic ring 52 and the projections 64 may be formed as an injection molded two-component plastic part.

The plastic ring 52 thus unites several functions. For one, it serves to secure the compression sleeve 30 to the supporting body 16 of the fitting body 12. Furthermore, it serves as a carrier for the projections 64 indicating compression. Finally, through its (end) face 58, it assumes a function as an abutment and guide for the pressing tool 62.

The invention claimed is:

1. A press fitting for a plastic pipe or a pipe of a plastic/metal composite material, the press fitting comprising:
  a fitting body, comprising a supporting body onto which a pipe to be connected may be slipped,
  a compression sleeve including a holding end at which the compression sleeve is held on the fitting body, and further comprising a compression region on the circumferential surface, which adjoins the holding end and in which a pressing tool acts when the compression sleeve is compressed,
  the compression sleeve having its holding end provided with at least one edge cutout open to the end face of the compression sleeve, which cutout includes a bounding edge section opposite the end face of the compression sleeve, and
  a plastic ring which is fitted on the outside of the compression sleeve against the holding end, enclosing the compression sleeve, and which is secured to the compression sleeve against movement in the axial direction of the compression sleeve,
  wherein the plastic ring comprises
    a plastic ring end face parallel to the end face of the compression sleeve, material cutouts formed in the plastic ring end face, and
    at least one axially protruding projection
      extending from the plastic ring end face and into the compression region of the compression sleeve, the at least one axially protruding projection configured to be at least one of
      destroyed when the pressing tool acts on the compression sleeve and separated from the plastic ring.

2. The press fitting of claim 1, characterized in that the projection extends for less than 180 degrees in the circumferential direction of the plastic ring.

3. The press fitting of claim 1, characterized in that the plastic ring has three projections arranged offset in the circumferential direction.

4. The press fitting of claim 1 , characterized in that the plastic material of the projection is more brittle than a material of the plastic ring.

5. The press fitting of claim 1, characterized in that the plastic ring is provided as an abutment for the pressing tool.

6. The press fitting of claim 1, characterized in that the plastic ring is arranged between the end face of the compression sleeve and the opposite bounding edge sections of the edge cutouts.

7. The press fitting of claim 1, characterized in that the plastic ring is connected with the compression sleeve so as to be secured against axial movement by friction locking or form locking.

8. The press fitting of claim 1, characterized in that the fitting body has an outer circumferential recess, and that the holding end of the compression sleeve is provided with an inner circumferential projection for plunging into the circumferential recess of the fitting body.

9. The press fitting of claim 1, characterized in that the plastic ring has at least one radially inward projecting securing projection for locking against rotation, which is plunged into one of the edge cutouts in the holding end of the compression sleeve.

10. The press fitting of claim 1, characterized in that the plastic ring is arranged on the compression sleeve such that the edge cutouts are at least partly exposed by the radially-outward face of the plastic ring as seen in a side view of the press fitting.

11. The press fitting of claim 1, characterized in that the plastic ring is substantially aligned with the end face of the compression sleeve.

12. The press fitting of claim 1, characterized in that the plastic ring material cutouts are arranged in radial alignment with the edge cutouts of the compression sleeve.

13. The press fitting of claim 12, characterized in that the plastic ring comprises a plurality of projections extending into the compression region of the compression sleeve, which are arranged between the material cutouts of the plastic ring.

14. The press fitting of claim 1, characterized in that the compression sleeve is formed with position control openings at its holding end.

15. The press fitting of claim 14, characterized in that the position control openings are formed by regions of the edge cutouts of the compression sleeve.

16. The press fitting of claim 14, characterized in that the position control openings are arranged between regions of the edge cutouts of the compression sleeve, as seen in the circumferential direction of the pipe fitting.

17. The press fitting of claim 1, characterized in that the plastic ring is provided as a guide for the pressing tool.

18. The press fitting of claim 1, characterized in that the fitting body has an outer circumferential projection, and that the holding end of the compression sleeve is provided with an inner circumferential recess into which the circumferential projection of the fitting body engages.

19. The press fitting of claim 1, characterized in that the projection is connected with the plastic ring by a predetermined braking point.

\* \* \* \* \*